March 25, 1947.                G. M. GIANNINI                 2,417,927
                           SOUND DIRECTION FINDER
                           Filed March 22, 1943              5 Sheets-Sheet 1

INVENTOR.
GABRIEL M. GIANNINI
BY
Davis, Lindsey, Smith & Shonts,
ATTORNEYS

Patented Mar. 25, 1947

2,417,927

UNITED STATES PATENT OFFICE 2,417,927

SOUND DIRECTION FINDER

Gabriel M. Giannini, North Hollywood, Calif., assignor, by mesne assignments, to Automatic Electric Laboratories, Inc., a corporation of Delaware Application March 22, 1943, Serial No. 480,028

15 Claims. (Cl. 177—386)

The present invention relates to sound direction finders and more particularly to such finders of the electro-acoustic or microphone type.

It is an object of the present invention to provide a sound direction finder which is of compact and economical construction and arrangement and which is highly efficient in operation.

Another object of the invention is to provide a sound direction finder comprising a plurality of movable microphones and utilizing an improved electric circuit arrangement for determining when the microphones are moved into substantial alignment with respect to a source of sound.

Another object of the invention is to provide a sound direction finder comprising an improved indicator arrangement for indicating when the direction of a source of sound has been established.

Another object of the invention is to provide a sound direction finder comprising an improved arrangement of a plurality of microphones, whereby the response of the finder is extremely sensitive.

A further object of the invention is to provide a sound direction finder which is of improved construction and arrangement lending the finder particularly suitable for use aboard a ship or other craft.

A further object of the invention is to provide a sound direction finder which is of improved construction and arrangement lending the finder particularly suitable for use upon a submarine or other submersible device.

Further features of the invention pertain to the particular construction and arrangement of the mechanical and electrical elements of the sound direction finder, whereby the above-outlined and additional operating advantages are attained.

The invention, both as to its organization and method of operation, together with further objects and advantages thereof, will best be understood by reference to the following specification taken in connection with the accompanying drawings, in which.

Figures 1, 2:
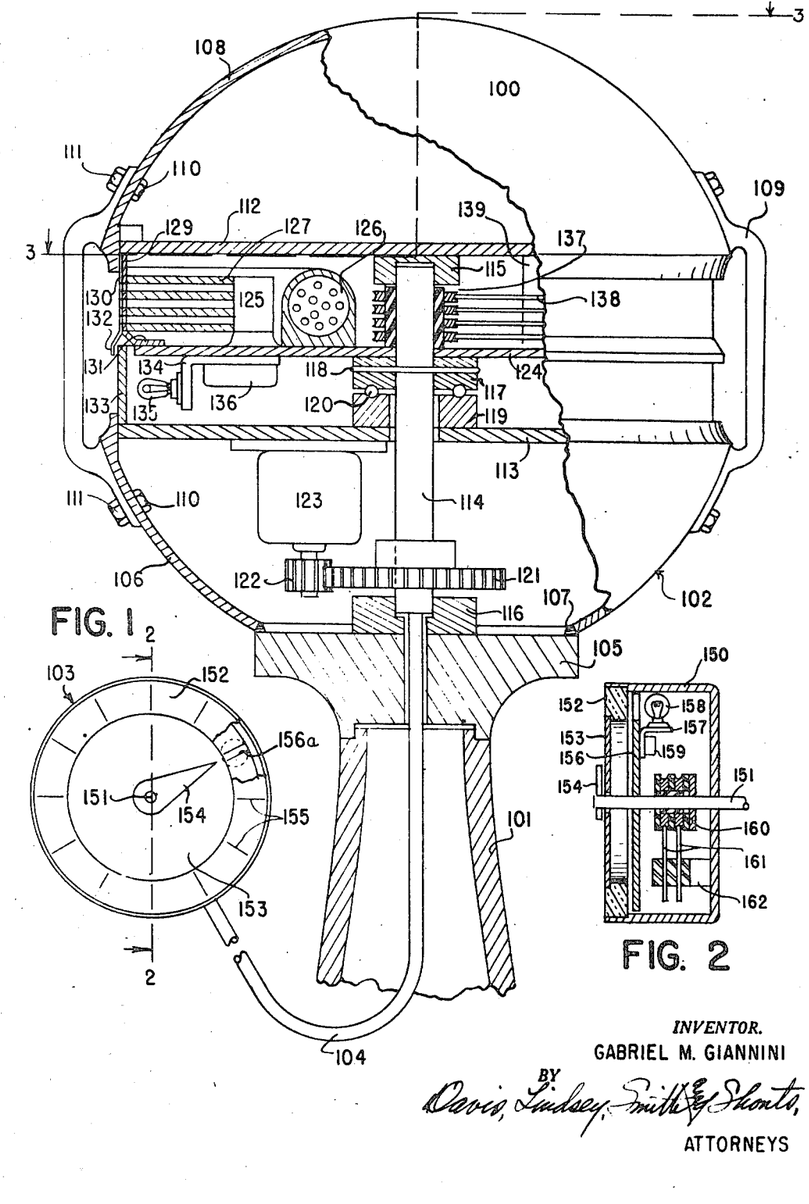
Figure 1 is a side elevational view, partly in section, of a sound direction finder embodying the present invention.
Fig. 2 is a longitudinal sectional view, taken in the direction of the arrows along the line 2—2 in Fig. 1 of the indicator incorporated in the sound direction finder.
Figure 3:
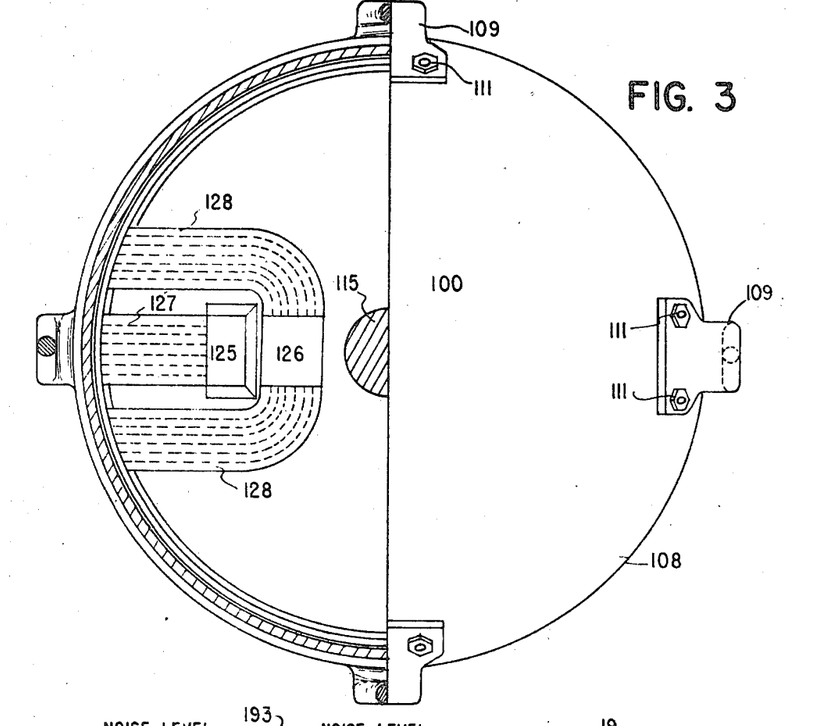
Fig. 3 is a plan sectional view, taken in the direction of the arrows along the line 3—3 in Fig. 1, of the sound direction finder.

Referring now more particularly to Figs. 1 to 3, inclusive, of the drawings, the sound direction finder 100 there shown comprises an upstanding cylindrical tubular pedestal 101, a substantially spherical head 102 mounted on the upper end of the pedestal 101, and an indicator 103 disposed remote from the head 102 and operatively connected thereto by means of a flexible transmission cable 104 extending through the hollow pedestal 101. The head 102 comprises a disk-shaped collar 105 suitably mounted on the upper end of the tubular pedestal 101, a lower semispherical shell 106 welded to the collar 105 as indicated at 107, an upper semispherical shell 108 and four radially spaced-apart straps 109 extending between and securing together the lower and upper shells 106 and 108. The straps 109 are secured to the lower and upper shells 106 and 108 by removable bolts 110 extending through aligned openings provided in the adjacent walls of the associated shells and the ends of the straps 109, the ends of the bolts 110 being threaded to receive cooperating nuts 111, whereby the upper and lower shells 106 and 108 are retained together in spaced-apart relation. A disk-shaped top plate 112 is suitably secured in the open end of the upper shell 108; and a disk-shaped bottom plate 113 is suitably secured in the open end of the lower shell 106.

Centrally disposed in the head 102 is a rotatable shaft 114 which extends through a centrally located opening provided in the bottom plate 113, the upper end of the shaft 114 being located by a suitable guide bearing 115 carried by the lower surface of the top plate 112 and the lower end of the shaft 114 being located by a suitable guide bearing 116 carried by the upper surface of the collar 105. Finally the shaft 114 is mounted for rotation upon thrust bearing structure including an upper thrust ring 117 secured to the shaft 114 by a pin 118 and a lower thrust ring 119 secured to the upper surface of the bottom plate 113 and surrounding the centrally disposed opening formed therein, suitable balls 120 being arranged in bearing channels formed in the upper and lower thrust rings 117 and 119. At this point it is noted that the extreme lower end of the shaft 114 is rigidly connected to one end of the flexible transmission cable 104 extending to the indicator 103. Also the shaft 114 carries a gear 121 which cooperates with a pinion 122 secured to the shaft of a suitable electrical motor 123, the frame of the motor 123 being suitably secured to the lower surface of the bottom plate 113; whereby the shaft 114 may be rotated by the electric motor 123 in an obvious manner. Also the shaft 114 carries a substantially disk-shaped platform 124 which is disposed between the top plate 112 and the bottom plate 113, whereby the platform 124 may be rotated with the shaft 114 between the plates mentioned.

The upper surface of the platform 124 carries a pilot microphone 125 and a locator microphone 126 arranged in nested relation, as clearly indicated in Fig. 3. Preferably, the pilot microphone 125 is of the ordinary directional type and of the construction disclosed in the copending application of Gabriel M. Giannini, Serial No. 419,165, filed November 14, 1941, now patent No. 2,341,539, granted February 15, 1944; while the locator microphone 126 is of the balanced directional type and of the construction disclosed in the copending application of Gabriel M. Giannini, Serial No. 419,166, filed November 14, 1941. More particularly, the pilot microphone 125 comprises a single insulating structure 127 through which communicating sound passages are formed; while the locator microphone 126 comprises two spaced-apart insulating structures 128 through which communicating sound passages are formed; the structure 127 being disposed intermediate the structures 128, as previously noted. Closure structure is secured to the upper surface of the platform 124 which extends between the platform 124 and the lower rim of the upper shell 108; which closure structure comprises nested inner and outer cylindrical rings 129 and 130. The lower end of the inner ring 129 is flanged inwardly and directly secured to the upper surface of the platform 124 as indicated at 131; the lower end of the outer ring 130 is flanged outwardly away from the periphery of the platform 124 as indicated at 132; while the upper ends of the inner and outer rings 129 and 130 are disposed within the lower rim of the upper shell 108. Also it is noted that suitable registering openings are provided in the inner and outer rings 129 and 130 which communicate with the sound passages formed in the structures 127 and 128 which in turn communicate with the pilot microphone 125 and the locator microphone 126. Finally a transparent ring 133 is secured to the upper surface of the bottom plate 113 adjacent the periphery thereof and extending between the upper rim of the lower shell 106 and the platform 124. More particularly, the upper end of the transparent ring 133 extends between the periphery of the platform 124 and the downwardly depending flange 132 carried by the outer ring 130. This arrangement provides for free rotation of the platform 124 and the rings 129 and 130 secured thereto with respect to the transparent ring 133 and the lower rim of the upper shell 108, and seals the interior of the head 102 against damage due to inclement weather.

Further, the lower surface of the platform 124 carries an angular bracket 134 upon which a lamp 135 and an audible alarm or buzzer 136 are mounted, the lamp 135 being disposed within, and a short distance from, the transparent ring 133, whereby the lamp 135, when illuminated, is visible as a bright spot through the adjacent section of the transparent ring 133. Finally the shaft 114 carries commutating structure 137 which cooperates with wipers 138 carried by an insulator 139 secured to the lower surface of the top plate 112, whereby the relatively rotatable and stationary electrical elements of the sound direction finder 100 may be electrically connected together.

As best shown in Figs. 1 and 2 of the drawings, the indicator 103 comprises a substantially cup-shaped shell 150 in which a centrally located shaft 151 is suitably journaled for rotation, the shaft 151 being rigidly connected to the flexible transmission cable 104. A transparent ring 152 is secured in the open end of the shell 150 and carries a disk 153 having an opening therein through which the outer end of the shaft 151 projects. The outer end of the shaft 151 carries a pointer 154 which cooperates with suitable indicia 155 disposed about the outer surface of the transparent ring 152. Also the shaft 151 carries a disk 156 disposed below the transparent ring 152, the disk 156 carrying an angular bracket 157 which supports a lamp 158 and an audible alarm or buzzer 159. Also the disk 156 has a radially disposed slot 156a formed therein adjacent the periphery thereof which provides for the passage of light from the lamp 158 through the transparent ring 152, the lamp 158 being disposed inwardly and in direct alignment with the slot 156a formed in the disk 156 and the transparent ring 152. Finally the shaft 151 carries commutating structure 160 which cooperates with wipers 161 carried by an insulator 162 secured to the inner surface of the bottom wall of the shell 150, whereby the relatively rotatable and stationary electrical elements of the indicator 103 may be electrically connected together.

Figure 7:
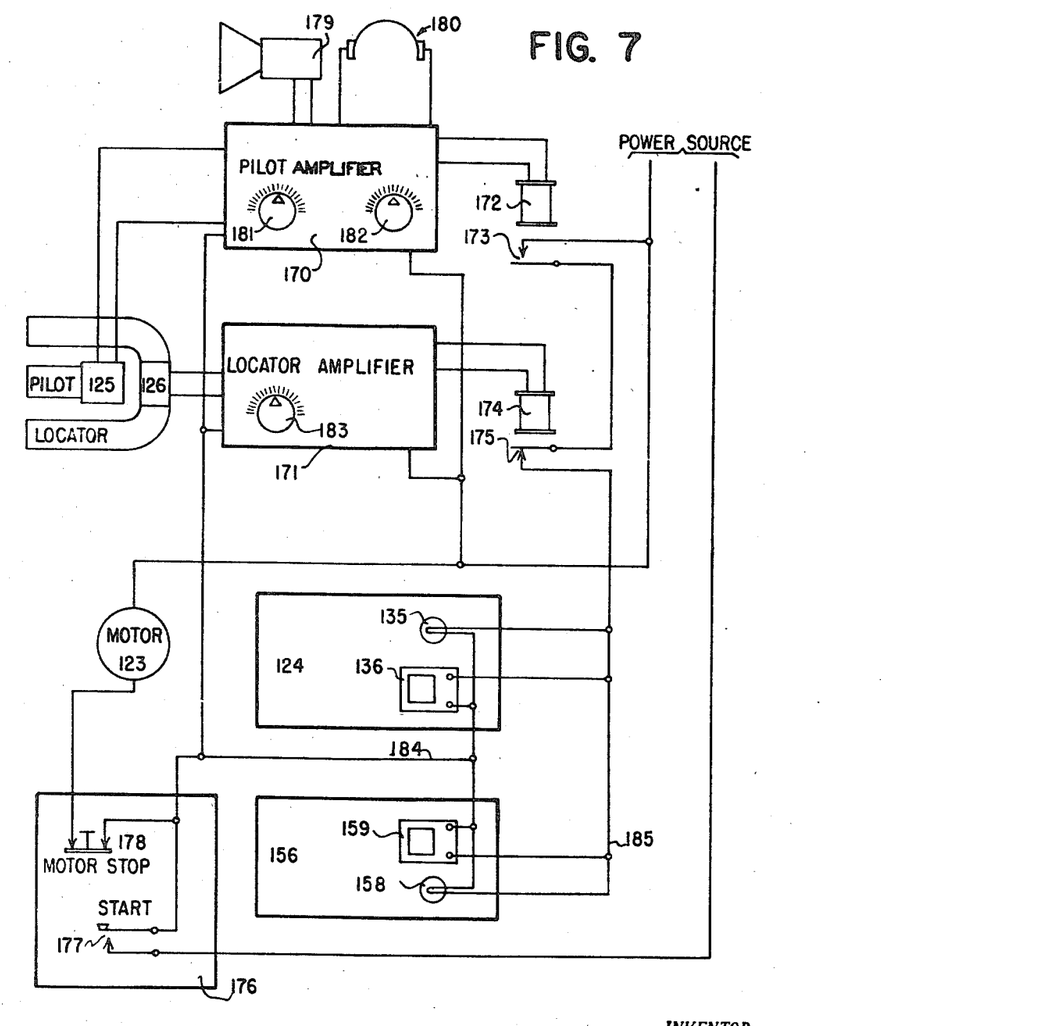
Fig. 7 is a schematic diagram of the electric circuit incorporated in the sound direction finder.

Finally, the sound direction finder 100 comprises certain other electrical elements and a circuit network which are best shown in Fig. 7. More particularly, the network comprises a pilot amplifier 170 of the vacuum tube type and of any suitable form, a locator amplifier 171 of the vacuum tube type and of any suitable form, a pilot relay 172 any suitable type provided with a pair of make contacts 173, a locator relay 174 of any suitable type provided with a pair of break contacts 175, a power panel 176 provided with a start key 177 and a motor stop key 178, a loud speaker 179 of any suitable type, a receiver set 180 of any suitable type and a source of power supply indicated. More particularly, the pilot amplifier 170 comprises a power input circuit adapted to be closed by the start key 177 across the line conductors of the power source, a signal input circuit connected to the pilot microphone 125, a signal relay output circuit connected to the pilot relay 172, a signal speaker output circuit connected to the loud speaker 179, a signal receiver output circuit connected to the receiver set 180, first gain control equipment for governing the gain of the signal relay output circuit and controlled by the dial 181, and second gain control equipment for governing the gain of the signal speaker and signal receiver output circuits and controlled by the dial 182. Similarly, the locator amplifier 171 comprises a power input circuit adapted to be closed by the start key 177 across the line conductors of the power source, a signal input circuit connected to the locator microphone 126, a signal relay output circuit connected to the locator relay 174, and gain control equipment for governing the gain of the signal relay output circuit and controlled by the dial 183. The motor 123 includes an operating circuit which is adapted to be closed by the start key 177 across the line conductors of the power source through the motor stop key 178, the motor 123, the motor stop key 178 and the start key 177 being arranged in series circuit relation. Finally the lamps 135 and 158 and the buzzers 136 and 159 are connected in multiple across the conductors 184 and 185; which conductors may be bridged across the line conductors of the power source when the start key 177 is operated, the locator relay 174 is restored and the pilot relay 172 is operated, whereby the lamps 135 and 158 are illuminated and the buzzers 136 and 159 are operated to produce an audible alarm.

Figures 4, 5, 6:
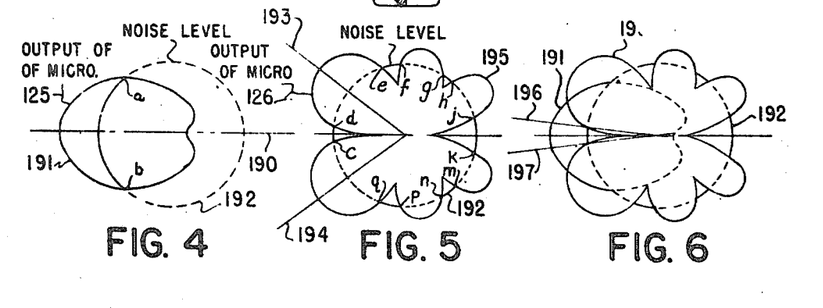
Fig. 4 illustrates graphically the directional performance characteristic of the pilot microphone incorporated in the sound direction finder.
Fig. 5 illustrates graphically the directional performance characteristic of the locator microphone incorporated in the sound direction finder.
Fig. 6 illustrates graphically the composite directional performance characteristic of the two microphones incorporated in the sound direction finder.

Considering now the directional performance characteristics of the pilot microphone 125 and the locator microphone 126, reference is had to the graphic illustrations appearing in Figs. 4 to 6, inclusive, of the drawings. Referring particularly to Fig. 4, it is noted that the pilot microphone 125 has a maximum output when it is directed toward the left in the direction of the source of sound along the horizontal line 190 indicated, and a minimum output when it is directed toward the right away from the direction of the source of sound along the horizontal line 190; wherey the output characteristic of the pilot microphone 125 conforms to the single petal pattern outlined by the performance curve 191. Assuming a circular noise level curve 192, it will be noted that the performance curve 191 of the pilot microphone 125 projects beyond the noise level curve 192 only between the points a and b. Referring particularly to Fig. 5, it is noted that the locator microphone 126 has a maximum output when it is directed toward the left at an angle with respect to the direction of the source of sound either along the inclined line 193 indicated or the inclined line 194 indicated, the inclined line 193 being disposed above the horizontal line 190 at an angle of approximately 30° and the inclined line 194 being disposed below the horizontal line 190 at an angle of approximately 30°; the locator microphone 126 has a minimum output when it is directed toward the left in the direction of the source of sound along the horizontal line 190, and six points of peak and six points of valley output interposed therebetween; whereby the output characteristic of the locator microphone 126 conforms to the six petal pattern outlined by the performance curve 195. Again assuming the circular noise level curve 192, it will be noted that the performance curve 195 of the locator microphone 126 dips below the noise level curve six times between the points c—d, e—f, g—h, i—k, m—n and p—q. Now referring particularly to Fig. 6 comprising a composite illustration of the performance curve 191 of the pilot microphone 125, the performance curve 195 of the locator microphone 126 and the noise level curve 192, it will be understood that simultaneously the performance curve 191 projects beyond the noise level curve 192 and the performance curve 195 dips below the noise level curve 192 only between the acute angle defined by the inclined lines 196 and 197 directed toward the center of the circular noise level curve 192 and respectively disposed above and below the horizontal line 190. The utilization of the joint condition mentioned of the pilot microphone 125 and the locator microphone 126, when the head 102 of the sound direction finder 100 is disposed in the acute angle defined etween the lines 196 and 197, is explained more fully hereinafter.

Now considering the mode of operation of the sound direction finder 100 both with respect to the mechanical and electrical features of the operation thereof, it is noted that the pedestal 101 is mounted upon a suitable support in a substantially vertical direction, whereby the platform 124 is rotatable in a substantially horizontal plane. At this time operation of the sound direction finder 100 is initiated by closing the start key 177, whereby the previously traced circuit, including the motor stop key 178, is completed for operating the motor 123, which operating circuit is maintained, assuming that the start key 177 is of the locking type. Also when the start key 177 is closed the previously traced power circuits for the pilot amplifier 170 and the locator amplifier 171 are completed, rendering the amplifiers mentioned operative. Upon operating, the motor 123 rotates the pinion 122 and consequently the shaft 114 through the gear 121 in either direction desired. The shaft 114 is mounted for rotation upon the thrust bearing arrangement, including the thrust rings 117 and 119 and the balls 120, whereby the platform 124 and the commutator structure 137 are rotated with the shaft 114. As the platform 124 is thus rotated the pilot microphone 125 and the locator microphone 126 are rotated, whereby the microphones mentioned are first moved toward and then away from the direction of a source of sound.

Now assuming that there is a source of sound existent, the direction of which is to be located by the sound direction finder 100, the output characteristics of the pilot microphone 125 and the locator microphone 126 conform to the performance curves 191 and 195 illustrated in Figs. 4 to 6, inclusive, of the drawings, as previously explained. More particularly, the pilot microphone 125 operates to impress a signal upon the associated signal input circuit; whereby the signal mentioned is amplified and impressed by the pilot amplifier 170 upon the associated signal relay output circuit, signal speaker output circuit and signal receiver output circuit. The first gain control equipment of the pilot amplifier 170 is adjusted by the dial 181, whereby the output current supply to the signal relay output circuit conforms to the performance curve 191 illustrated in Fig. 4; which current is of sufficient magnitude to effect operation of the marginal pilot relay 172 only when the performance curve 191 projects beyond the noise level curve 192. Accordingly, it will be understood that the pilot relay 172 is operated only during the arc of rotation of the platform 124 disposed between the points a and b, as indicated in Fig. 4. Also the second gain control equipment of the pilot amplifier 170 is adjusted by the dial 182, whereby the output current supply to the signal speaker output circuit and to the signal receiver output circuit conforms to the performance curve 191 illustrated in Fig. 4; which current is of sufficient magnitude to effect appreciable operation of the loud speaker 179 and the receiver set 180 only when the performance curve 191 projects beyond the noise level curve 192. Accordingly, it will be understood that the loud speaker 179 and the receiver set 180 are operated appreciably only during the arc of rotation of the platform 124 disposed between the points a and b, as indicated in Fig. 4. More particularly, the locator microphone 126 operates to impress a signal upon the associated signal input circuit; whereby the signal mentioned is amplified and impressed by the locator amplifier 171 upon the associated signal relay output circuit. The gain control equipment of the locator amplifier 171 is adjusted by the dial 183, whereby the output current supply to the signal relay output circuit conforms to the performance curve 195 illustrated in Fig. 5; which current is of insufficient magnitude to effect the restoration of the marginal locator relay 174 only when the performance curve 195 dips below the noise level curve 192. Accordingly, it will be understood that the locator relay 174 is restored only during the arcs of rotation of the platform 124 disposed between the points c—d, e—f, g—h, j—k, m—n and p—q, as indicated in Fig. 5. Thus it will be understood that simultaneously the pilot relay 172 is operated and the locator relay 174 is restored only during the narrow arc of rotation of the platform 124 defined between the acute angle formed by the inclined lines 196 and 197, as indicated in Fig. 6.

When both the pilot relay 172 is operated and the locator relay 174 is restored, the angular position of the platform 124 is disposed within the acute angle formed by the inclined lines 196 and 197, as explained in conjunction with Fig. 6; whereby the sound direction finder 100 has located the direction of the source of sound. At this time, when the pilot relay 172 is operated and the locator relay 174 is restored, the previously mentioned multiple circuits for illuminating the lamps 135 and 158 and for operating the buzzers 136 and 159 are completed. When the buzzers 136 and 159 are thus operated the motor stop key 178 is operated, thereby to interrupt the previously traced operating circuit for the motor 123; which operating circuit is retained interrupted, assuming that the motor stop key 178 is of the locking type. When the operating circuit for the motor 123 is thus interrupted, further operation thereof is arrested and, consequently, further rotation of the shaft 114 and the platform 124 is arrested. At this time the pilot microphone 125 and the locator microphone 126 are directed toward the source of sound, as previously explained.

At this time the illuminated lamp 135 disposed below the transparent ring 133 is visible as a bright spot therebelow, whereby the angular position of the platform 124 and consequently the direction of the source of sound are established with reference to the stationary transparent ring 133. At this point it is noted that the transparent ring 133 may bear suitable indicia, whereby the angular direction of the source of sound may be interpreted directly in ordinary compass values. Also the operation of the buzzer 136 directs attention to the fact that the platform 124 occupies its angularly adjusted position in the direction of the source of sound.

Also it is noted that when the shaft 114 is rotated the flexible transmission cable 104 is rotated therewith, whereby the shaft 151 of the indicator 103 is correspondingly rotated. The pointer 154 carried by the end of the shaft 151 and cooperating with the indicia 155 borne by the transparent ring 152 is so adjusted that at any time the angular position of the platform 124 may be read directly from the indicator 103 due to the cooperation between the pointer 154 and the indicia 155 borne by the transparent ring 152. Accordingly, at this time, the illuminated lamp 158 disposed below the disk 156 and the transparent ring 152 projects a beam of light through the slot 156a formed adjacent the periphery of the disk 156 and appears as a bright spot below the transparent ring 152, whereby the angular position of the platform 124 and consequently the direction of the source of sound are established; whereby the angular direction of the source of sound may be interpreted directly from the indicator 103. At this point it is noted that the indicia 155 borne by the transparent ring 152 may be calibrated in ordinary compass values. Also the operation of the buzzer 159 directs attention to the fact that the platform 124 occupies its angularly adjusted position in the direction of the source of sound.

In order to arrest operation of the sound direction finder 100, it is only necessary to open the start key 177, whereby the previously traced multiple circuits for illuminating the lamps 135 and 158 and for operating the buzzers 136 and 159 are interrupted. Also when the start key 177 is opened the power input circuits of the pilot amplifier 170 and the locator amplifier 171 are interrupted in order to arrest operation thereof. When operation of the pilot amplifier 170 is thus arrested the pilot relay 172 restores and further operation of the loud speaker 179 and the receiver set 180 is arrested, and when operation of the locator amplifier 171 is thus arrested the locator relay 174 is retained in its restored position. At this time the operation of the sound direction finder 100 is completely arrested and all of the electrical elements thereof are deenergized. In connection with the operation of the sound direction finder 100 it is noted that the lamps 135 and 158 and the buzzers 136 and 159 are respectively illuminated and operated periodically as the platform 124 continues to rotate. Thus it will be understood that the rotation of the platform 124 may be arrested at any convenient time when the lamps 135 and 158 are illuminated and the buzzers 136 and 159 are operated by opening the motor stop key 178, in the manner previously explained. Finally, in connection with the release of the sound direction finder 100, it is pointed out that after the start key 177 is opened the motor stop key 178 is reclosed, thereby again conditioning the sound direction finder 100 for reoperation merely by again closing the start key 177. Further, in connection with the operation of the sound direction finder 100, it is pointed out that when the platform 124 is rotated to establish the direction of the source of sound, the loud speaker 179 and the receiver set 180 also produce a maximum output which may be detected audibly. Thus it will be understood that the operation of the sound direction finder 100 to locate the angular direction of the source of sound is indicated not only at the head 102 by the illumination of the lamp 135 and the operation of the buzzer 136, but it is also indicated by the operation of the loud speaker 179 and the receiver set 180 as well as by the indicator 103 disposed at the remote point. More particularly, in the indicator 103, the illumination of the lamp 158 and the operation of the buzzer 159 both indicate the condition mentioned.

Figures 8, 9:
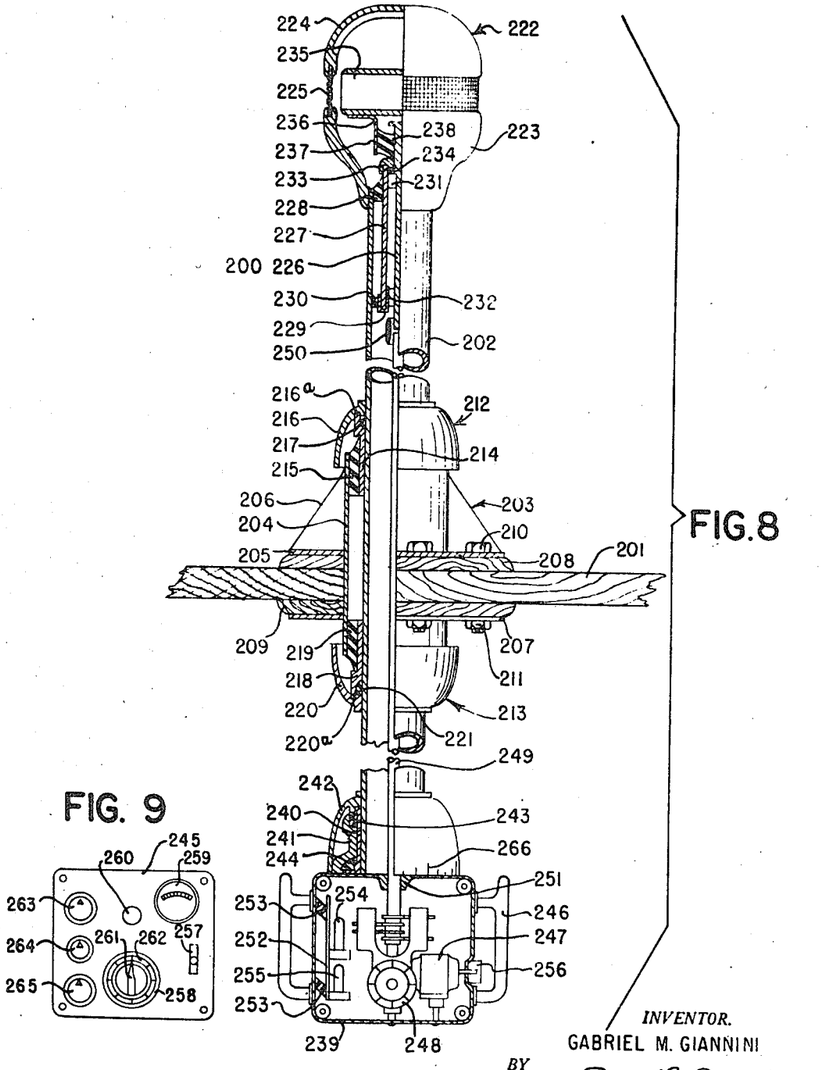
Fig. 8 is a side elevational view, partly in section, of a modified form of the sound direction finder.
Fig. 9 is a front view of the instrument panel carried by the housing of the sound direction finder shown in Fig. 8.

Referring now more particularly to Figs. 8 and 9 of the drawings, the modified form of the sound direction finder 200 there shown is adapted to be supported by the deck 201 of a ship or other craft, whereby the upper portion of the sound direction finder 200 projects above the deck 201 and the lower portion of the sound direction finder 200 projects below the deck 201 into a suitable compartment provided in the ship. More particularly, the sound direction finder 200 comprises a cylindrical tubular member 202 which projects through a supporting bracket 203 mounted on the upper surface of the deck 201; the supporting bracket 203 comprising a tubular body 204 carrying an annular ring 205, and upstanding triangular braces 206 extending between the tubular body 204 and the annular ring 205. The supporting bracket 203 is firmly secured in place upon the deck 201 by an arrangement comprising a clamping ring 207, a collar 208 formed of wood or the like and disposed between the upper surface of the deck 201 and the annular ring 205, a collar 209 formed of wood or the like and disposed between the lower surface of the deck 201 and the clamping ring 207, and a number of bolts 210; the bolts 210 extending through aligned openings provided in the annular ring 205, the clamping ring 207, the deck 201 and the collars 208 and 209 and receiving cooperating nuts 211 on the threaded ends thereof. Disposed between the tubular member 202 and the tubular body 204 are two connections 212 and 213 respectively disposed adjacent the upper and lower ends of the tubular body 204; which connections 212 and 213 permit relative turning movement between the tubular member 202 and the tubular body 204.

More particularly, the connection 212 comprises a sleeve 214 surrounding the tubular member 202 and secured to the inner surface of the tubular body 204 by an interposed mounting ring 215 formed of rubber or the like. Also the connection 212 comprises a downwardly directed skirt 216 rigidly secured to the tubular member 202 and covering the upper end of the tubular body 204, the mounting ring 215 and the sleeve 214, thereby to prevent the entrance of moisture between the tubular member 202 and the tubular body 204. Further the upper end of the sleeve 214 comprises a bearing surface projecting into an annular recess 216a formed in the undersurface of the skirt 216, thereby to support the skirt 216 and the tubular member 202 and further to seal the parts mentioned. Finally a gasket 217 disposed in an annular recess formed in the upper end of the sleeve 214 is disposed between the upper end of the sleeve 214, the adjacent surface of the tubular member 202 and the adjacent undersurface of the skirt 216 in order further to seal the parts mentioned. Thus it will be understod that the connection 212 not only rotatably supports the tubular member 202 upon the supporting bracket 203 but it also provides a resilient mounting or cushion therebetween and further effectively seals the connection between the tubular member 202 and the tubular body 204. More particularly, the connection 213 comprises a sleeve 218 surrounding the tubular member 202 and secured to the inner surface of the tubular body 204 by an interposed mounting ring 219 formed of rubber or the like. Also the connection 213 comprises an upwardly directed skirt 220 rigidly secured to the tubular member 202 and covering the lower end of the tubular body 204, the mounting ring 219 and the sleeve 218. Further the lower end of the sleeve 218 comprises a bearing surface projecting into an annular recess 220a formed in the upper surface of the skirt 220, thereby to prevent lateral movement of the skirt 220 and consequently the tubular member 202. Finally a gasket 221 disposed in an annular recess formed in the lower end of the sleeve 218 is disposed between the lower end of the sleeve 218, the adjacent surface of the tubular member 202 and the adjacent upper surface of the skirt 220 in order to seal the parts mentioned. Thus it will be understood that the connection 213 not only guides the rotatable support of the tubular member 202 upon the supporting bracket 203 but it also provides a resilient mounting or cushion therebetween and further effectively seals the connection between the tubular member 202 and the tubular body 204.

The upper end of the tubular member 202 terminates in a head 222 which comprises an upwardly directed cup-shaped shell 223 directly secured to the upper end of the tubular member 202 and an inverted cup-shaped cap 224, the cap 224 being supported by the cup-shaped shell 223 by an arrangement comprising a cylindrical reticulated screen 225. More particularly, the lower end of the reticulated screen 225 is suitably embedded in an annular recess formed in the upwardly directed open rim of the shell 223; and the upper end of the reticulated screen 225 is suitably embedded in an annular recess formed in the downwardly directed open rim of the cap 224. Rotatably mounted within the upper end of the tubular member 202 and the shell 223 is a stub shaft 226, which is supported by a bearing arrangement comprising a cylindrical sleeve 227 disposed within the upper end of the tubular member 202. More particularly, the upper end of the sleeve 227 is secured to the adjacent inner surface of the tubular member 202 adjacent the upper end thereof by an interposed mounting ring 228 formed of rubber or the like; and the lower end of the sleeve 227 carries a fixture 229, which is secured to the adjacent inner surface of the tubular member 202 by an annular mounting ring 230 formed of rubber or the like. The upper end of the sleeve 227 carries a step bearing 231 which supports the stub shaft 226; and the fixture 229 carries a guide bearing 232 adjacent the lower end of the sleeve 227, which prevents lateral movement of the stub shaft 226. Finally the upper end of the sleeve 227 carries an annular cap 233 having an opening in the end thereof through which the stub shaft 226 extends, a gasket 234 being arranged mutually between the cap 233, the step bearing 231, the upper end of the sleeve 227 and the adjacent surface of the stub shaft 226. The arrangement of the mounting ring 228, the sleeve 227, the cap 233 and the gasket 234 disposed between the tubular member 202 and the rotatably mounted stub shaft 226 seals the interior of the tubular member 202 with respect to the interior of the shell 223, thereby positively to prevent the entrance of moisture from the interior of the shell 223 into the tubular member 202. Also this arrangement including the mounting rings 228 and 230 provides the stub shaft 226 with a resilient mounting with respect to the tubular member 202.

A rotatable transmitter support 235 is arranged within the head 222 in alignment with respect to the reticulated screen 225, and is rigidly secured to a fixture 236. The fixture 236 comprises a downwardly directed cylindrical portion 237 surrounding the end of the stub shaft 226 and resiliently connected thereto by a mounting ring 238 formed of rubber or the like. Accordingly, the transmitter support 235 is resiliently mounted on the upper end of the stub shaft 226 by the mounting ring 238 for rotation with the stub shaft 226 within the head 222 and in alignment with respect to the reticulated screen 225. The transmitter support 235 carries a suitable pilot microphone and a locator microphone, not shown, which are mounted within the structure thereof and take any suitable forms, such, for example, as the arrangement of the microphones disclosed in conjunction with the sound direction finder 100.

As previously noted, the lower end of the tubular member 202 projects through the deck 201 and terminates within a compartment formed in the ship; and the lower end of the tubular member 202 rotatably supports an instrument housing 239. More particularly, a tubular sleeve 240 is rigidly secured to the lower end of the tubular member 202 and a tubular sleeve 241 is rigidly secured to the upper surface of the housing 239, the sleeve 241 surrounding the sleeve 240 and being rotatably supported thereby, whereby the sleeve 240 constitutes a step bearing supporting the sleeve 241 and consequently the housing 239 secured to the sleeve 241. Also the lower end of the tubular member 202 carries a downwardly directed skirt 242 covering the sleeves 240 and 241 and terminating immediately adjacent the upper surface of the housing 239. An arrangement including a gasket 243, formed of rubber or the like, disposed in an annular recess provided in the upper end of the sleeve 241 and positioned mutually between the sleeve 241, the sleeve 240 and the undersurface of the skirt 242, is provided for sealing the relative rotatable sleeves 240 and 241. Also a gasket 244 disposed in an annular recess formed in the lower end of the sleeve 241 and disposed between the adjacent surfaces of the sleeves 240 and 241 is provided in order further to seal the relatively rotatable sleeves mentioned.

The housing 239 comprises a hollow box-like structure provided with a removable front wall or instrument panel 245 and two handles 246 secured to the opposite side walls thereof, the handles 246 accommodating ready rotation of the housing 239 with respect to the skirt 242 carried by the tubular member 202. Within the housing 239 certain mechanical and electrical equipment are provided. More particularly, an electrical motor 247 and an associated transmission mechanism 248 are provided in the housing 239; the transmission mechanism 248 rotatably supports a drive shaft 249, the upper end of which is secured to the lower end of the stub shaft 226 by a fixture 250 disposed within the tubular member 202. Also the section of the drive shaft 249 extending between the interior of the housing 239 and the interior of the tubular member 202 is supported by a bearing 251 carried by the upper wall of the housing 239. Also a panel 252 is arranged within the housing 239 and resiliently supported by the side wall thereof by an arrangement comprising a number of resilient blocks 253 formed of rubber or the like; the panel 252 carrying certain of the electrical equipment including a pilot amplifier 254 and a locator amplifier 255. The side wall of the housing 239 carries a start key 256; and the front wall 245 carries other of the electrical equipment including a motor stop key 257, an indicator 258, a meter 259 and a lamp 260. The indicator 258 is operatively associated with the transmission mechanism 248 and comprises a pointer 261 and an associated scale 262, whereby the relative angular position of the operating shaft 249 with respect to the housing 239 may be readily interpreted. In the sound direction finder 200 the electrical circuit arrangement is substantially identical to that provided in the sound direction finder 100 and illustrated in Fig. 7 of the drawings. More particularly, in this case, the pilot amplifier 254 comprises a signal relay output circuit connected to a pilot relay, not shown, a signal meter output circuit connected to the meter 259, first gain control equipment for governing the gain of the signal relay output circuit and controlled by a dial 263 carried by the front wall 245, and second gain control equipment for governing the gain of the signal meter output circuit and controlled by a dial 264 carried by the front wall 245; and the locator amplifier 255 comprises a signal relay output circuit connected to a locator relay, not shown, and gain control equipment for governing the gain of the signal relay output circuit and controlled by a dial 265 carried by the front wall 245. Finally the lamp 260 is provided with a control circuit governed by the pilot relay and the locator relay, not shown.

In view of the foregoing description of the construction and arrangement of the sound direction finder 200, it will be understood that after it is mounted upon the deck 201 the tubular member 202 thereof is rotated to a position of proper orientation and thereafter no further rotation of the tubular member 202 during normal operation of the sound direction finder 200 is contemplated. Finally it is pointed out that the lower end of the skirt 242 carries reference indicia 266 which cooperates with suitable reference indicia, not shown, carried by the top wall of the housing 239, whereby the relative angular position of the housing 239 with respect to the skirt 242 and the tubular member 202 may be readily interpreted.

In order to initiate operation of the sound direction finder 200, the start key 256 is operated, whereby operation of the motor 247 is initiated. The motor 247 causes rotation of the operating shaft 249 through the transmission mechanism 248, whereby the stub shaft 226 and the transmitter support 235 are rotated, the transmitter support 235 being rotated below the reticulated screen 225, causing the supported pilot and locator microphones to sweep a horizontal field, in an obvious manner. The transmission mechanism 248 causes operation of the indicator 258, whereby the relative position of the operating shaft 249 with reference to the housing 239 and consequently the relative angular position of the microphone support 235 may be readily interpreted by the cooperation of the pointer 261 and the associated scale 262. The pilot microphone and the locator microphone carried by the microphone support 235 determine the direction of the source of sound in the manner described in conjunction with the operation of the sound direction finder 100, whereby the associated pilot amplifier 254 and the locator amplifier 255 are controlled, causing the lamp 260 to be illuminated when the approximate angle of the direction of the source of sound is located. At this time the motor stop key 257 may be operated. Thereafter the position of the housing 239 with respect to the skirt 242 may be adjusted by means of the handles 246, causing further rotation of the operating shaft 249 and consequently the microphone support 235. When the housing 239 is rotated with respect to the skirt 242 by the handles 246 the operating shaft 249 and the transmission mechanism 248 are rotated therewith, whereby there is no further adjustment of the relative angular position between the operating shaft 249 and the transmission mechanism 248 and consequently no further operation of the indicator 258. At this time the angular position of the housing 239 with respect to the skirt 242 and consequently further adjustment of the microphone support 235 may be effected by the handles 246, whereby the pilot microphone carried by the microphone support 235 governs the associated pilot amplifier 254 in order to cause the meter 259 to produce a maximum reading. At this time the precise angle of the direction of the source of sound is located and may be readily determined by a combination of readings taken from the indicator 258 and the indicia 266. In other words, the relative angular position of the operating shaft 249 with respect to the housing 239 is determined by the indicator 258; and the angular position of the housing 239 with respect to the skirt 242 and the tubular member 202 may be determined with reference to the indicia 266 borne by the skirt 242, whereby a composite indication is obtained which represents the angular position of the microphone support 235 with respect to the head 222 and consequently to the tubular member 202. Having determined the angular position of the microphone support 235 with respect to the tubular member 202, and having previously orientated the angular position of the tubular member 202 with respect to the center line of the ship, the exact compass position of the direction of the source of sound may be readily determined.

Figure 10:
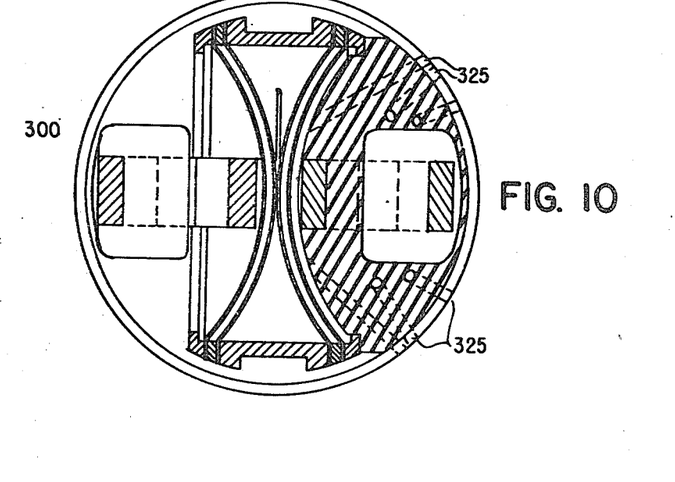
Fig. 10 is a plane sectional view of a further modified form of the sound direction finder.
Figure 11:
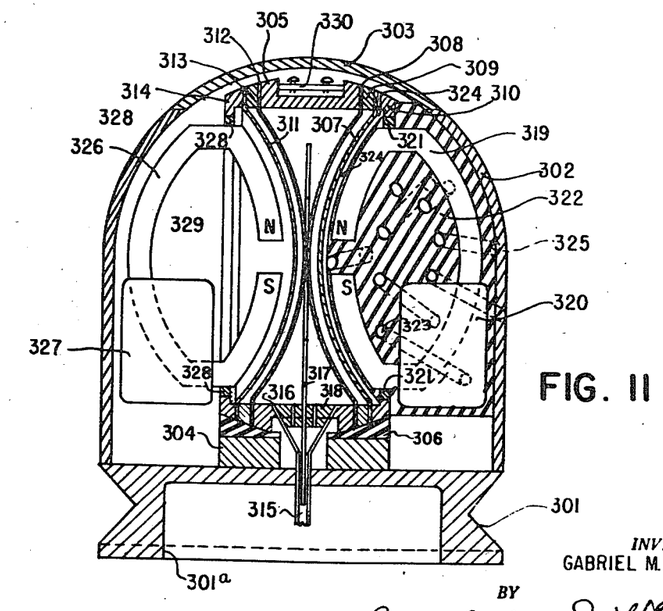
Fig. 11 is a longitudinal sectional view of the sound direction finder shown in Fig. 10.

Referring now more particularly to Figs. 10 and 11 of the drawings, the further modified form of the sound direction finder 300 there shown is adapted to be supported by the periscope of a submarine or other submersible craft or by a diving bell or the like. The sound direction finder 300 comprises a base 301 which is adapted to be directly secured to the periscope or other rotatable part and a substantially bell-shaped casing 302 hermetically sealed to the base 301, the casing 302 including a removable dome 303 hermetically sealed thereto. The interior of the casing 302 is hollow and carries a substantially centrally disposed supporting ring 304 upon which is mounted an upstanding annular frame 305, the frame 305 being mounted upon the supporting ring 304 by means of a mounting ring 306 formed of rubber or the like, whereby the frame 305 is resiliently supported by the supporting ring 304. One end of the frame 305 is hermetically sealed by an arrangement comprising a substantially semispherical and inwardly directed diaphragm 307, a substantially semispherical and inwardly directed reticulated screen 308, an intervening spacing ring 309, and a clamping ring 310, the reticulated screen 308 directly engaging the adjacent end of the frame 305, the spacing ring 309 being disposed between the peripheral portions of the reticulated screen 308 and the diaphragm 307 and the clamping ring 310 directly engaging the adjacent peripheral portion of the diaphragm 307. The elements named are retained in assembled relation by screws or the like, not shown, whereby the adjacent end mentioned of the frame 305 is hermetically sealed. Similarly, the other end of the frame 305 is hermetically sealed by an arrangement comprising a substantially semispherical and inwardly directed diaphragm 311, a substantially semispherical and inwardly directed reticulated screen 312, an intervening spacing ring 313, and a clamping ring 314, the reticulated screen 312 directly engaging the adjacent end of the frame 305, the spacing ring 313 being disposed between the peripheral portions of the reticulated screen 312 and the diaphragm 311 and the clamping ring 314 directly engaging the adjacent peripheral portion of the diaphragm 311. The elements named are retained in assembled relation by screws or the like, not shown, whereby the adjacent end mentioned of the frame 305 is hermetically sealed.

Accordingly, the two inwardly directed reticulated screens 308 and 312 are respectively spaced with respect to the associated diaphragms 307 and 311 to protect the diaphragms mentioned and are disposed substantially in contact with each other adjacent the centers thereof at the approximate center of the frame 305. Also a substantially centrally disposed conduit 315 is arranged within a recess 301a formed in the base 301 and projects through an opening provided in the top wall of the base 301, the upper end of the conduit 315 being flared outwardly to provide a substantially cone-shaped throat 316 secured in a cooperating conical opening provided in the bottom of the frame 305, whereby the interior of the compartment defined between the frame 305 and the cooperating diaphragms 307 and 311 communicates through the conduit 315 with the exterior. Also a breather tube 317 is arranged within the conduit 315 and extends toward the top of the compartment mentioned defined between the frame 305 and the diaphragms 307 and 311, the breather tube 317 having an offset central portion disposed out of contact with respect to the reticulated screens 308 and 312, whereby the interior of the compartment mentioned may be vented through the breather tube 317. The breather tube 317 is suitably supported in the throat 316 of the conduit 315 by an associated plug 318, the breather tube 317 extending through an opening formed in the plug 318 and the plug 318 having other openings therein directly connecting the interior of the compartment formed between the frame 305 and the diaphragms 307 and 311 and the interior of the throat 316 of the conduit 315.

The diaphragm 307 forms a part of a first microphone which also includes a substantially C-shaped field structure 319 carrying a winding or coil 320, the field structure 319 being suitably secured to the clamping ring 310 by a number of blocks or wedges 321 illustrated. The diaphragm 307 is formed of magnetic material while the field structure 319 comprises a permanent magnet arranged in spaced relation with respect thereto, whereby a magnetic field is normally set up between the north and south poles of the permanent magnet 319 which includes the adjacent section of the diaphragm 307. Also the blocks 321 disposed between the permanent magnet 319 and the clamping ring 310 are formed of nonmagnetic material, thereby to prevent flux leakage between the top and bottom portions of the permanent magnet 319 and the adjacent peripheral portion of the diaphragm 307. The first microphone, comprising the permanent magnet 319 and the coil 320, is embedded in a molded block 322 formed of rubber or the like and filling a portion of the interior of the casing 302 disposed between the clamping ring 310 and the adjacent inner side wall of the casing 302. The block 322 has a number of openings 323 formed therein out of contact with the permanent magnet 319 and the coil 320 and communicating between a chamber 324 defined between the block 322 and the adjacent surface of the diaphragm 307, the openings 323 also communicating through openings 325 formed in the casing 302. Accordingly, the chamber 324 defined between the diaphragm 307 and the block 322 communicates with the exterior through the openings 323 formed in the block 322 and the openings 325 formed in the casing 302.

Similarly, the diaphragm 311 forms a part of a second microphone which also includes a substantially C-shaped field structure 326 carrying a winding or coil 327, the field structure 326 being suitably secured to the clamping ring 314 by a number of blocks or wedges 328 illustrated. The diaphragm 311 is formed of magnetic material while the field structure 326 comprises a permanent magnet arranged in spaced relation with respect thereto, whereby a magnetic field is normally set up between the north and south poles of the permanent magnet 326 which includes the adjacent section of the diaphragm 311. Also the blocks 328 disposed between the permanent magnet 326 and the clamping ring 314 are formed of the nonmagnetic material, thereby to prevent flux leakage between the top and bottom portions of the permanent magnet 326 and the adjacent peripheral portion of the diaphragm 311. The second microphone, comprising the permanent magnet 326 and the coil 327, is arranged within an air filled cavity 329 formed in the casing 302 adjacent the diaphragm 311. Finally a terminal block 330 is provided which is supported in a recess formed in the frame 305; which terminal block terminates the coils 320 and 327. Finally it is noted that the terminal block 330 may be electrically connected through the compartment formed between the frame 305 and the diaphragms 307 and 311, the plug 318 and the conduit 315 to the exterior. Preferably, the two microphones are wired in opposition to each other, whereby the sound direction finder 300 is of the balance type.

Considering now the operation of the sound direction finder 300 after the supporting craft or the like has reached the surface, the periscope or other support upon which the sound direction finder 300 is mounted is projected into the air and is rotated by any suitable means. At this point it is noted that any water entering the chamber 324 defined between the diaphragm 307 and the block 322 through the openings 323 is drained therefrom after the sound direction finder 300 is positioned in the associated atmosphere; and that such water has no deleterious effect upon the second microphone due to the water impervious nature of the material of which the block 322 embedding the elements of the second microphone is formed. At this time the chamber 324 formed adjacent the diaphragm 307 and the block 322 is directly connected via the openings 323 to the atmosphere; while the cavity 329 disposed adjacent the diaphragm 311 of the second microphone is shielded by the side wall of the casing 302. Hence, the first microphone will produce a greater output than the second microphone, assuming that the same intensity of sound is reaching the diametrically disposed surfaces of the casing 302, as will be readily appreciated. At this time the base 301 and consequently the casing 302 are rotated until a maximum output is obtained from the two balanced connected microphones. At this time the first microphone comprising the permanent magnet 319 and the coil 320 is directed toward the source of sound, whereby the associated apparatus, through which the sound direction finder 300 is revolved, is operative to indicate the direction of the source of sound in ordinary compass values, in the manner previously explained. The construction of the sound direction finder illustrated in Figs. 10 and 11 is claimed in a copending divisional application Serial No. 621,062, filed October 8, 1945.

While the preferred embodiments of the invention have been disclosed, it will be understood that various modifications may be made therein which are within the true spirit and scope of the invention.

What is claimed is:

1. A sound direction finder comprising a member mounted for rotation, two microphones having sound openings facing in the same direction supported by said member, the individual outputs of said microphones varying in accordance with established patterns in response to rotation of said member with respect to a direction line extending between said member and a source of sound, said microphones being so constructed and arranged that they respectively produce maximum and minimum points of output in their individual output patterns only when said member occupies a substantially fixed angular position with respect to said direction line, whereby the angular position or direction of said source of sound with respect to said sound openings is established, and means responsive jointly to the production of maximum and minimum points of output in said individual output patterns for producing a signal.

2. A sound direction finder comprising a member mounted for movement, a first microphone of the directional type and a second microphone of the balanced directional type supported by said member, said microphones having sound openings therefor facing in the same direction for the reception of sound, the output of said first microphone varying in response to movement of said member and being a maximum when said sound openings are substantially aligned with respect to a direction line extending between said member and a source of sound, the output of said second microphone varying in response to movement of said member and being a minimum when said sound openings are substantially aligned with respect to said direction line, whereby the position or direction of said source of sound with respect to said member is established when the outputs of said first and second microphones are respectively maximum and minimum, and means responsive jointly to maximum and minimum outputs of said first and second microphones respectively for producing a signal.

3. A sound direction finder comprising a member mounted for rotation, a first microphone of the directional type and a second microphone of the balanced directional type supported by said member, said microphones having sound openings therefor facing in the same direction for the reception of sound, the output of said first microphone varying in response to rotation of said member and being a maximum when said sound openings are substantially aligned with respect to a direction line extending between said member and a source of sound, the output of said second microphone varying in response to rotation of said member and being a minimum when said sound openings are substantially aligned with respect to said direction line, whereby the angular position or direction of said source of sound with respect to said member is established when the outputs of said first and second microphones are respectively maximum and minimum, and means responsive jointly to maximum and minimum outputs of said first and second microphones respectively for producing a signal.

4. A sound direction finder comprising a housing including upper and lower sections secured together in spaced-apart relation and a member arranged between said sections and mounted for rotation, motor means disposed within said housing for rotating said member, a pair of microphones having sound openings therefor facing in the same direction supported by said member and disposed within said housing, said microphones being so constructed and arranged that they respectively produce maximum and minimum points of output when said openings are substantially in alignment with a direction line extending between said member and a source of sound, and electric circuit means controlled by the said maximum and minimum points of output of said microphones for determining the angular position of said member when said sound openings are substantially aligned with respect to said source of sound, thereby to establish the angular position or direction of said source of sound with respect to said member.

5. A sound direction finder comprising a housing including upper and lower sections secured together in spaced-apart relation and a member arranged between said sections and mounted for rotation, motor means disposed within said housing for rotating said member, a pair of microphones having sound openings therefor facing in the same direction supported by said member and disposed within said housing, said microphones being so constructed and arranged that they respectively produce maximum and minimum points of output when said openings are substantially in alignment with a direction line extending between said member and a source of sound, electric circuit means controlled by the said maximum and minimum points of output of said microphones for determining the angular position of said member when said sound openings are substantially aligned with respect to said source of sound, thereby to establish the angular position or direction of said source of sound with respect to said member, an indicator, and means controlled by said electric circuit means for causing said indicator to indicate the established direction of said source of sound.

6. A sound direction finder comprising a housing including upper and lower sections secured together in spaced-apart relation and a member arranged between said sections and mounted for rotation, motor means disposed within said housing for rotating said member, a scale carried by one of said sections, a lamp carried by said member and cooperating with said scale, a pair of microphones having sound openings therefor facing in the same direction supported by said member and disposed within said housing, said microphones being so constructed and arranged that they respectively produce maximum and minimum points of output when said openings are substantially in alignment with a direction line extending between said member and a source of sound, electric circuit means controlled by the said maximum and minimum points of output of said microphones for determining the angular position of said member when said sound openings are substantially aligned with respect to said source of sound, thereby to establish the angular position or direction of said source of sound with respect to said member, and means controlled by said electric circuit means for causing said lamp to illuminate the portion of said scale corresponding to the established direction of said source of sound.

7. A sound direction finder comprising a housing including upper and lower sections secured together in spaced-apart relation and a member arranged between said sections and mounted for rotation, motor means disposed within said housing for rotating said member, a pair of microphones having sound openings therefor facing in the same direction supported by said member and disposed within said housing, said microphones being so constructed and arranged that they respectively produce maximum and minimum points of output when said openings are substantially in alignment with a direction line extending between said member and a source of sound, electric circuit means controlled by the said maximum and minimum points of output of said microphones for determining the angular position of said member when said sound openings are substantially aligned with respect to said source of sound, thereby to establish the angular position or direction of said source of sound with respect to said member, an indicator including a scale and a rotatable element, a lamp carried by said element and cooperating with said scale, means for rotating said element in accordance with the rotation of said member, and means controlled by said electric circuit means for causing said lamp to illuminate the portion of said scale corresponding to the established direction of said source of sound.

8. A sound direction finder comprising a tubular column, a head carried by the upper end of said column, a housing carried by the lower end of said column and mounted for relative rotation with respect thereto, a member disposed within said head and mounted for relative rotation with respect thereto, a motor disposed within said housing, a transmission connection extending through said column between said motor and said member, whereby said member may be rotated relative to said housing, a pair of microphones supported by said member and disposed within said head and communicating with the exterior through sound openings, said microphones being so constructed and arranged that they respectively produce maximum and minimum points of output when said openings are substantially in alignment with a direction line extending between said member and a source of sound, electric circuit means controlled by the said maximum and minimum points of output of said microphones for determining the angular position of said member when said sound openings are substantially aligned with respect to said source of sound, first indicator means for indicating the relative angular position between said member and said housing, and second indicator means for indicating the relative angular position between said housing and said column, whereby the angular position or direction of said source of sound with respect to said column may be established.

9. A sound direction finder comprising a support adapted to be mounted on the deck of a ship or the like, a tubular column carried by said support and mounted for relative rotary adjustment with respect thereto, said column projecting both above and below said support, a head carried by the upper end of said column, a housing carried by the lower end of said column and mounted for relative rotation with respect thereto, a member disposed within said head and mounted for relative rotation with respect thereto, a motor disposed within said housing, a transmission connection extending through said column between said motor and said member, whereby said member may be rotated relative to said housing, a plurality of microphone means supported by said member and disposed within said head and communicating with the exterior through sound openings, said microphones being so constructed and arranged that they respectively produce maximum and minimum points of output when said openings are substantially in alignment with a direction line extending between said member and a source of sound, electric circuit means controlled by the said maximum and minimum points of output of said microphone means for determining the angular position of said member when said sound openings are substantially aligned with respect to said source of sound, first indicator means for indicating the relative angular position between said member and said housing, and second indicator means for indicating the relative angular position between said housing and said column, whereby the angular position or direction of said source of sound with respect to said column may be established.

10. A sound direction finder comprising a tubular support adapted to be mounted on the deck of a ship or the like, a tubular column disposed within said support and mounted thereon for relative rotary adjustment with respect thereto, said column projecting both above and below said support, means for sealing said support to said column against the entrance of moisture, a head carried by the upper end of said column, a housing carried by the lower end of said column and mounted for relative rotation with respect thereto, a member disposed within said head and mounted for relative rotation with respect thereto, a motor disposed within said housing, a transmission connection extending through said column between said motor and said member, whereby said member may be rotated relative to said housing, a plurality of microphone means supported by said member and disposed within said head and communicating with the exterior through sound openings, said microphones being so constructed and arranged that they respectively produce maximum and minimum points of output when said openings are substantially in alignment with a direction line extending between said member and a source of sound, electric circuit means controlled by the said maximum and minimum points of output of said microphone means for determining the angular position of said member when said sound openings are substantially aligned with respect to said source of sound, first indicator means for indicating the relative angular position between said member and said housing, and second indicator means for indicating the relative angular position between said housing and said column, whereby the angular position or direction of said source of sound with respect to said column may be established.

11. A sound direction finder comprising a tubular column, a head carried by the upper end of said column, a housing carried by the lower end of said column and mounted for relative rotation with respect thereto, a member disposed within said head and mounted for relative rotation with respect thereto, a motor disposed within said housing, a transmission connection extending through said column between said motor and said member, whereby said member may be rotated relative to said housing, a plurality of microphone means supported by said member and disposed within said head and communicating with the exterior through sound openings, said microphones being so constructed and arranged that they respectively produce maximum and minimum points of output when said openings are substantially in alignment with a direction line extending between said member and a source of sound, amplifier means disposed within said housing and controlled by the said maximum and minimum points of output of said microphone means, electric circuit means controlled by said amplifier means for determining the angular position of said member when said sound openings are substantially aligned with respect to said source of sound, first indicator means for indicating the relative angular position between said member and said housing, and second indicator means for indicating the relative angular position between said housing and said column, whereby the angular position or direction of said source of sound with respect to said column may be established.

12. A sound direction finder comprising a tubular column, a head carried by the upper end of said column, a housing carried by the lower end of said column and mounted for relative rotation with respect thereto, a member disposed within said head and mounted for relative rotation with respect thereto, a motor disposed within said housing, a transmission connection extending through said column between said motor and said member, whereby said member may be rotated relative to said housing, a plurality of microphone means supported by said member and disposed within said head and communicating with the exterior through sound openings, said microphones being so constructed and arranged that they respectively produce maximum and minimum points of output when said openings are substantially in alignment with a direction line extending between said member and a source of sound, a device carried by said housing and operative to indicate when said sound openings occupy a position in substantial alignment with respect to said source of sound, electric circuit means controlled by the said maximum and minimum points of output of said microphone means for governing the operation of said device, first indicator means for indicating the relative angular position between said member and said housing, and second indicator means for indicating the relative angular position between said housing and said column, whereby the angular position or direction of said source of sound with respect to said column may be established.

13. A sound direction finder comprising a housing including upper and lower sections secured together in spaced-apart relation and a member arranged between said sections and mounted for rotation, a motor for rotating said member, a first microphone of the directional type having sound openings therefor facing in one direction supported by said member, a second microphone of the balanced directional type having sound openings therefor facing in the same direction as the sound openings of said first microphone supported by said member, the output of said first microphone being maximum when the sound openings therefor are substantially aligned with respect to a direction line extending between said housing and a source of sound, the output of said second microphone being minimum when the sound openings therefor are substantially aligned with respect to said direction line, and means controlled in response to simultaneous maximum and minimum outputs of said respective first and second microphones for determining the angular position of said housing with respect to a source of sound.

14. A sound direction finder comprising a housing including upper and lower sections secured together in spaced-apart relation and a member arranged between said sections and mounted for rotation, a pair of microphones having sound openings therefor facing in the same direction supported by said member and disposed within said housing, the output of one of said microphones varying in response to rotation of said member and being maximum when said sound openings therefor are substantially in alignment with a source of sound, the output of the other of said microphones varying in response to rotation of said member and being minimum when said sound openings therefor are substantially in alignment with said source of sound, and means controlled jointly by the maximum and minimum outputs of said microphones for locating the direction of said source of sound with respect to said housing.

15. In a sound direction finder, a member mounted for rotation, a directional microphone supported by said member, a plurality of sound openings extending in the same direction from one surface of the diaphragm of said microphone for rendering said microphone responsive within narrow limits when said sound openings are directed toward a source of sound, a balanced microphone supported by said member, a plurality of sound openings extending from opposite surfaces of the diaphragm of said balanced microphone in the same direction as the sound openings for said directional microphone for rendering said balanced microphone non-responsive within narrow limits when said last-mentioned sound openings are directed toward a source of sound, means for rotating said member, and means controlled jointly by the response of said directional microphone and the non-response of said balanced microphone for indicating that said sound openings therefor are directed toward a source of sound.

GABRIEL M. GIANNINI.

REFERENCES CITED

The following references are of record in the file of this patent:

UNITED STATES PATENTS

| Number | Name | Date |
|---|---|---|
| 2,297,972 | Mills | Oct. 6, 1942 |
| 2,128,398 | Cannon | Aug. 30, 1938 |
| 2,309,109 | Hathaway | Jan. 26, 1943 |
| 2,301,744 | Olson | Nov. 10, 1942 |
| 2,267,480 | Talcott | Dec. 23, 1941 |
| 1,836,397 | Rieber | Dec. 15, 1931 |
| 939,349 | Taylor | Nov. 9, 1909 |
| 420,217 | Thompson et al. | Jan. 28, 1890 |
| 1,149,123 | Fuller | Aug. 3, 1915 |
| 1,481,923 | Nash | Jan. 29, 1924 |
| 1,299,616 | Rieber | Apr. 8, 1919 |
| 2,166,991 | Guanella | July 25, 1939 |
| 2,299,620 | Giannini | Oct. 20, 1942 |
| 2,061,737 | Offenhauser | Nov. 24, 1936 |
| 1,892,645 | Olson et al. | Dec. 27, 1932 |
| 2,184,247 | Baumzweiger | Dec. 19, 1939 |

FOREIGN PATENTS

| Number | Country | Date |
|---|---|---|
| 548,334 | German | Apr. 9, 1932 |
| 297,977 | German | Jan. 19, 1920 |